J. Ball,
Plow Clevis,
No. 81,731.
Patented Sep. 1, 1868.
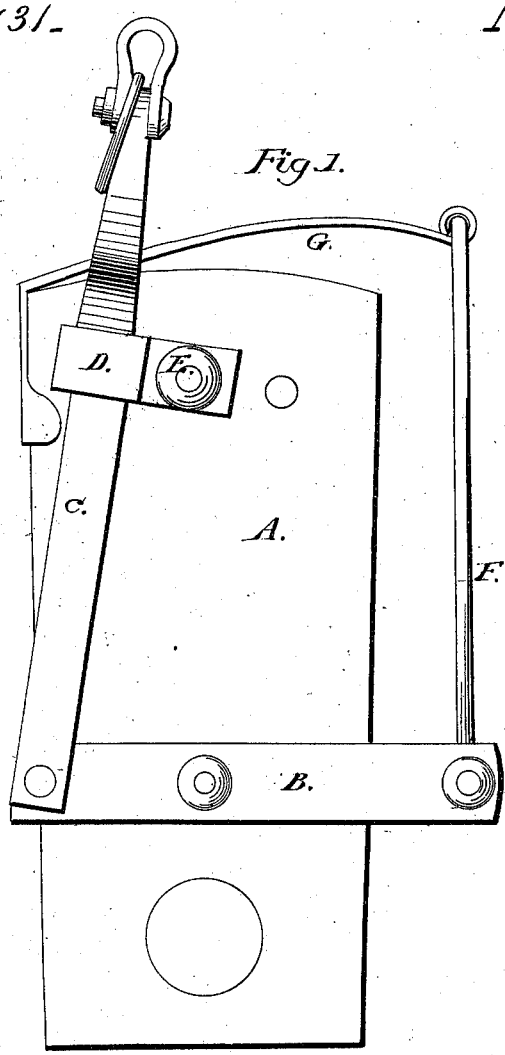
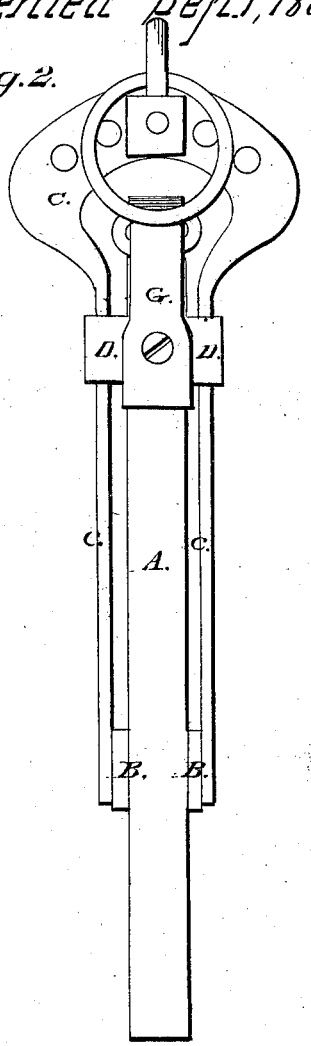
WITNESSES:
Inventor:
John Ball.
per Alexander Mason.
Attorney.

UNITED STATES PATENT OFFICE.

JOHN BALL, OF CANTON, OHIO.

IMPROVEMENT IN CLEVISES FOR PLOWS.

Specification forming part of Letters Patent No. 81,731, dated September 1, 1868.

*To all whom it may concern:*

Be it known that I, JOHN BALL, of Canton, in the county of Stark, and in the State of Ohio, have invented certain new and useful Improvements in Clevises for Plows; and I do hereby declare that the following is a full, clear, and exact description thereof, reference being had to the accompanying drawings, and to the letters of reference marked thereon.

The nature of my invention consists in a yielding clevis, so arranged with a spring that when the plow meets an obstruction in the ground sufficient to stop the team the spring will yield and not injure the horses' shoulders as much as if the clevis were rigid. It also prevents the plow from breaking when the latter strikes a stone or other obstruction in the ground.

In order to enable others skilled in the art to make and use my invention, I will now proceed to describe its construction and operation, referring to the annexed drawings, which form a part of this specification, and in which—

Figure 1 is a side view, and Fig. 2 a bottom view.

A represents the front end of the plow-beam, to which two levers, B B, are pivoted, one on each side. To the lower ends of these levers the rear ends of the clevis C are pivoted, said clevis constructed in any manner desired at the front end, but having side bars running along the sides of the plow-beam through metal loops D back to the lower ends of the levers, to which they are pivoted, as already mentioned. The loops D D are fastened to the front end of the plow-beam by means of a screw-bolt, E, and nut, and can be adjusted at any height on the said beam that may be desired.

Between the upper ends of the levers B B, which extend above the plow-beam, a rod, F, is pivoted, which rod runs forward, and in front of the beam is attached to the upper end of a spring, G, which in its turn passes downward inside of the clevis in front of the beam, and is fastened on the lower side of the beam, as shown in the drawings.

The spring G is made strong enough that when the plow moves forward it will not give; but the moment the plow meets with any resistance it gives and allows the lower ends of the levers to be drawn forward a short distance.

Any kind of spring may be used—for instance, a coiled spring—if answering the same purpose.

Having thus fully described my invention, what I claim as new, and desire to secure by Letters Patent, is—

1. The clevis C, constructed as described, in combination with the adjustable loops D D, for the purpose of raising or lowering the front end of the clevis, substantially as herein set forth.

2. The levers B B, pivoted to the sides of the plow-beam A, and their lower ends pivoted to the rear ends of the clevis C, in combination with the rod F and spring G, constructed as described, and operating substantially as and for the purposes herein set forth.

In testimony that I claim the foregoing I have hereunto set my hand this 24th day of June, 1868.

JOHN BALL.

Witnesses:
   W. W. CLARK,
   J. J. CLARK.